(12) United States Patent
Kihara et al.

(10) Patent No.: US 8,542,723 B2
(45) Date of Patent: Sep. 24, 2013

(54) INFORMATION PROCESSING APPARATUS AND INFORMATION GENERATION METHOD

(75) Inventors: Masahiro Kihara, Fukuoka (JP);
Tsutomu Togo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 12/952,492

(22) Filed: Nov. 23, 2010

(65) Prior Publication Data

US 2011/0292981 A1 Dec. 1, 2011

(30) Foreign Application Priority Data

Nov. 25, 2009 (JP) ................................ 2009-267220

(51) Int. Cl.
*H04B 3/46* (2006.01)
*H04N 7/12* (2006.01)
*G06F 15/16* (2006.01)

(52) U.S. Cl.
USPC ................. 375/224; 375/240.01; 375/240.24; 709/228; 709/231

(58) Field of Classification Search
USPC .............................................. 375/224, 240.01
See application file for complete search history.

(56) References Cited

U.S. PATENT DOCUMENTS

| 6,750,942 B2 | 6/2004 | Honda |
| 6,778,254 B2 | 8/2004 | Honda |
| 2003/0121053 A1 | 6/2003 | Honda |
| 2005/0204052 A1 | 9/2005 | Wang et al. |
| 2006/0179154 A1* | 8/2006 | Sitaraman et al. ............ 709/231 |
| 2008/0205507 A1* | 8/2008 | Komiya et al. .......... 375/240.01 |
| 2008/0240576 A1* | 10/2008 | Lee ............... 382/210 |
| 2009/0074414 A1* | 3/2009 | Miles et al. ..................... 398/75 |
| 2010/0166388 A1* | 7/2010 | Ushiki ............ 386/95 |

FOREIGN PATENT DOCUMENTS

| JP | 2002-325254 A | 11/2002 |
| JP | 2003-199128 A | 7/2003 |
| JP | 2006-33722 A | 2/2006 |
| JP | 2007-19802 A | 1/2007 |
| JP | 2007-43642 A | 2/2007 |
| JP | 2007-523540 A | 8/2007 |
| JP | 2008-211579 A | 9/2008 |
| WO | WO-2009/025357 A1 | 2/2009 |

\* cited by examiner

*Primary Examiner* — Brandon Renner
(74) *Attorney, Agent, or Firm* — Fujitsu Patent Center

(57) ABSTRACT

An information processing apparatus includes: a reception unit configured to receive a packet string in which packet groups including data on a plurality of video frames and having an identifier indicating a beginning of the video frame assigned to respective packets including each initial part of the plurality of video frames are arranged in a video reproduction order; a counting unit configured to count a number of received packets corresponding to each of the plurality of video frames based on respective initial packets in the packet string; and a generation unit configured to generate video quality estimation information for each of the plurality of video frames to estimate a quality of the video in which the plurality of video frames are decoded on a reception terminal based on the number of received packets corresponding to each of the plurality of video frames.

6 Claims, 15 Drawing Sheets

| NUMBER OF PACKETS | REPRODUCTION IMPORTANCE LEVEL (DEGRADATION QUALITY VALUE) | FRAME NUMBER |
|---|---|---|
| 0~P1 | X1(D1) | 2,3,5,6,8,9...,n+2 |
| P1+1~P2 | X2(D2) | 4,7,10...,n |
| P2+1~ | X3(D3) | 1,16,31,46,...,n+1 |

FIG. 4

| FRAME NUMBER | NUMBER OF PACKETS |
|---|---|
| 1 | 200 |
| 2 | 54 |
| 3 | 40 |
| ⋮ | ⋮ |
| n | 132 |
| n+1 | 228 |
| n+2 | 50 |
| ⋮ | ⋮ |

FIG. 5

| NUMBER OF PACKETS | REPRODUCTION IMPORTANCE LEVEL (DEGRADATION QUALITY VALUE) | FRAME NUMBER |
|---|---|---|
| 0~P1 | X1(D1) | 2,3,5,6,8,9...,n+2 |
| P1+1~P2 | X2(D2) | 4,7,10...,n |
| P2+1~ | X3(D3) | 1,16,31,46,...,n+1 |

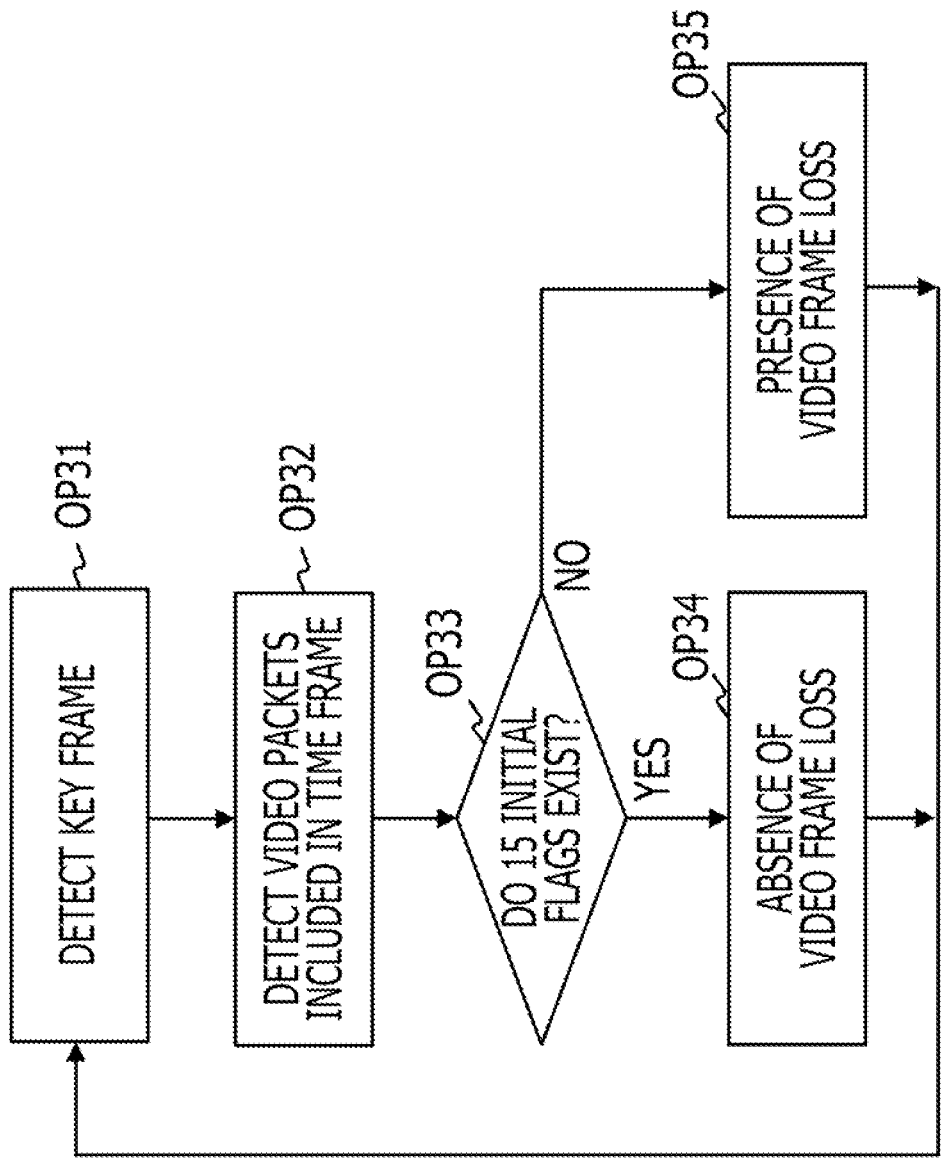

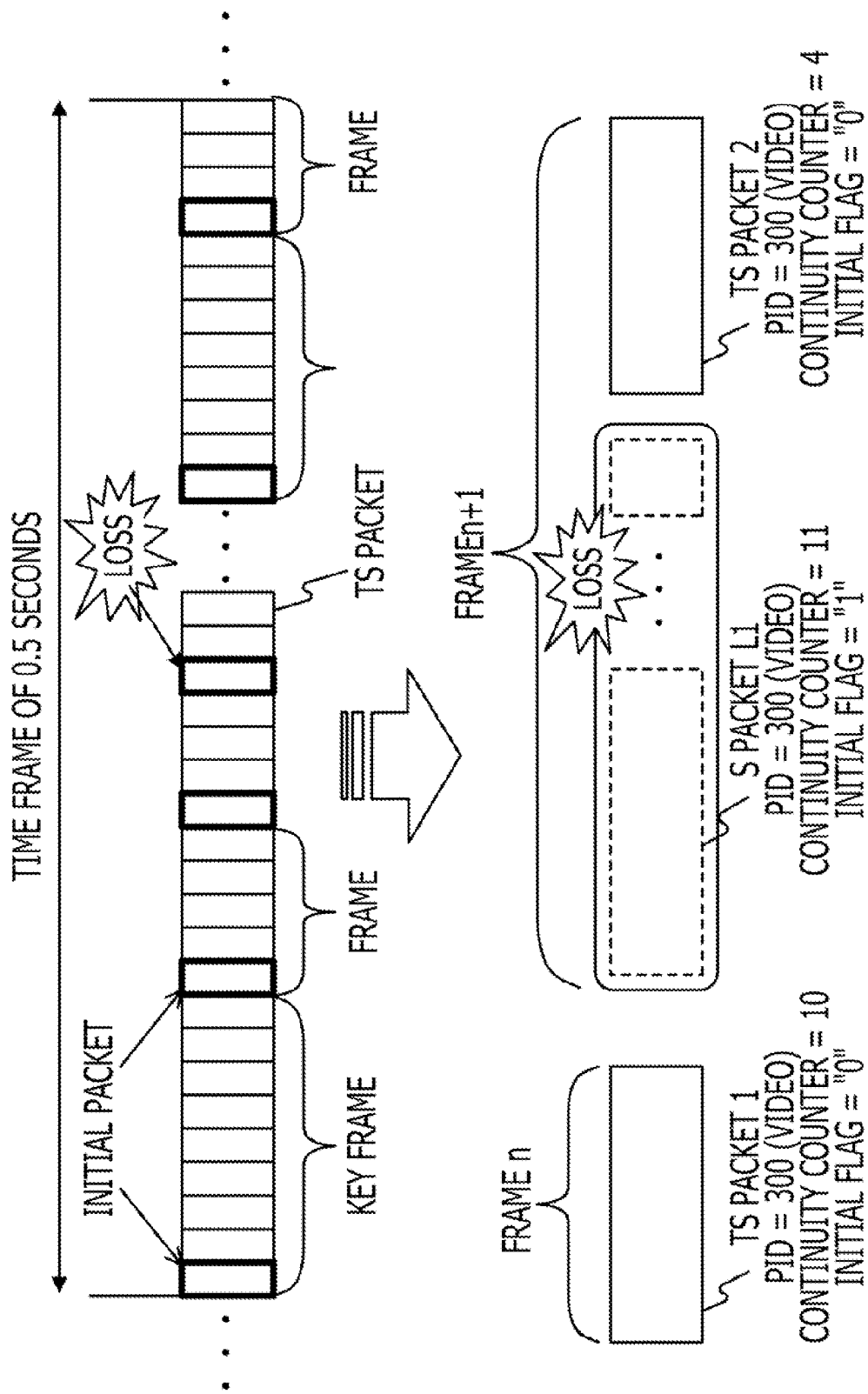

INFORMATION PROCESSING APPARATUS AND INFORMATION GENERATION METHOD

CROSS-REFERENCE TO RELATED APPLICATIONS

This application is based upon and claims the benefit of priority of the prior Japanese Patent Application No. 2009-267220, filed on Nov. 25, 2009, the entire contents of which are incorporated herein by reference.

FIELD

The embodiments discussed herein are related to an information processing apparatus for generating information used for estimating a quality of a video distributed on a network.

BACKGROUND

A service for distributing a high image quality video or a high sound quality audio via the internet includes, for example, IPTV (Internet Protocol TeleVision) and other services. According to the IPTV, a degradation in quality of the video or audio at a reception terminal is expected because of a loss of transferred packets or the like. A video quality estimation apparatus is proposed for estimating the quality of the video to be distributed in a case where the degradation in quality of the reception video and the reception audio at the reception terminal is expected.

A video quality estimation apparatus receives and decodes a video signal which is converted and sent into a packet string, decides a predetermined parameter as an intermediate parameter at least on the basis of packet loss information before the decoding of the video signal, analyzes the decoded video signal to determine a degradation type of the video signal, and estimates a video quality of the video signal after the decoding on the basis of the intermediate parameter and the degradation type. For example, Japanese Laid-open Patent Publication No. 2007-19802 discloses an estimation of a subjective quality of a video signal by extracting a media characteristic amount of a decoded video signal. Also, Japanese Laid-open Patent Publication No. 2007-43642 discloses an evaluation by extracting a characteristic amount of a picture using decoded data. Also, Japanese Laid-open Patent Publication No. 2006-33722 discloses a determination on a degradation state by creating reference data as preliminary data on a transmission side and using the reference data without using decoded data, which is not NR (Newton-Raphson) method not using an original image or information thereof. Japanese Laid-open Patent Publication No. 2002-325254 a determination on how many packets are lost with respect to one picture of decoded video while the decoding is a precondition.

SUMMARY

An information processing apparatus includes: a reception unit configured to receive a packet string in which packet groups including data on a plurality of video frames and having an identifier indicating a beginning of the video frame assigned to respective packets including each initial part of the plurality of video frames are arranged in a video reproduction order; a counting unit configured to count a number of received packets corresponding to each of the plurality of video frames based on respective initial packets in the packet string; and a generation unit configured to generate video quality estimation information for each of the plurality of video frames to estimate a quality of the video in which the plurality of video frames are decoded on a reception terminal based on the number of received packets corresponding to each of the plurality of video frames.

The object and advantages of the invention will be realized and attained by at least the feature, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a statistical information table;

FIG. 5 illustrates an example of a reproduction importance level table;

FIG. 12 is a flow chart illustrating an example of an investigation processing on the periodicity by a period determination unit; and FIG. 13 is a flow chart illustrating an example of a detection processing for a lost initial packet by the period determination unit.

DESCRIPTION OF EMBODIMENTS

Accordingly, it is an object of one aspect of the present invention to provide an information processing apparatus that efficiently generates information for estimating a quality of a video to be distributed on a network.

Hereinafter, example embodiments of the present invention will be described with reference to the accompanying drawings.

First Embodiment

According to a first embodiment, an information processing apparatus receives video packets flowing on a network that distribute a video and assigns evaluation values to respective video frames reproduced from the received video packet group.

Figure 1:
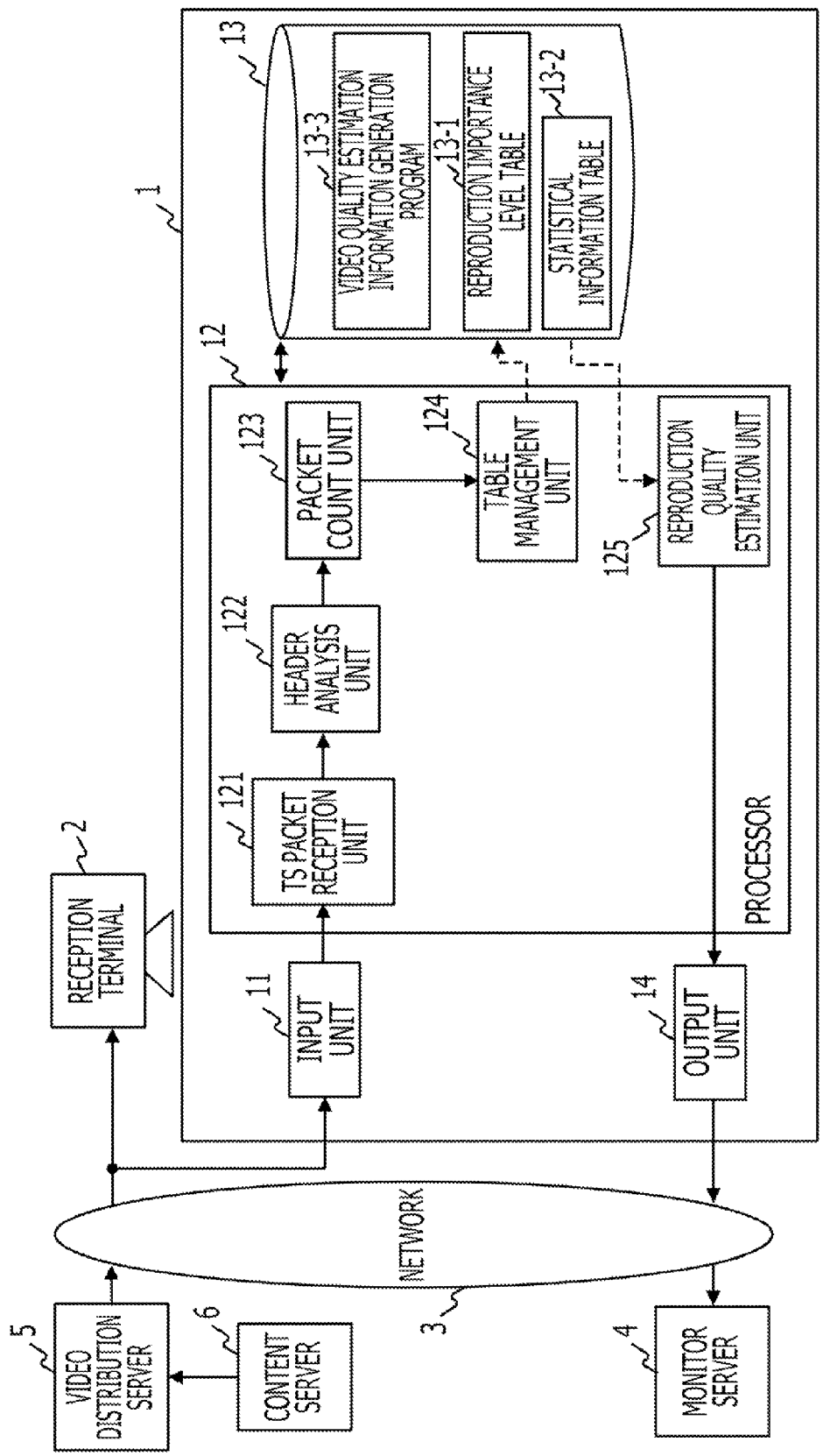
FIG. 1 illustrates a configuration example of an information processing apparatus.

FIG. 1 illustrates configuration examples of a video distribution system and an information processing apparatus. The video distribution system includes a content server 6, a video distribution server 5, a network 3, a reception terminal 2, an information processing apparatus 1, and a monitor server 4.

The content server 6 is a server for providing a video distribution service. The content server 6 holds a video content to be distributed on the network 3. The content server 6 is connected to the video distribution server 5 and transmits the video content to the video distribution server 5 as a data stream based on MPEG-2 TS (Moving Picture Experts Group phase 2 Transport Stream).

The video distribution server 5 is connected to the network 3. The video distribution server 5 performs, for example, an encryption on the data stream based on MPEG-2 TS received from the content server 6 and transmits the data stream via the network to the reception terminal 2 having a subscription for the video distribution service. The video distribution server 5 is, for example, a server managed by a communication carrier. The network 3 is, for example, an IP (Internet Protocol) network.

The data stream transmitted to the network 3 is branched during the network transmission. One component of the branched data stream is received by the reception terminal 2, and the other component is received by the information processing apparatus 1.

The reception terminal 2 is a terminal having the subscription for the video distribution service provided by the content server 6. The reception terminal 2 is connected to the network 3 and receives a stream of IP packet group transmitted from the content server 6 via the video distribution server 5. The reception terminal 2 outputs a video obtained by decoding the received stream of IP packet group to a display apparatus and provides the video to a user.

The information processing apparatus 1 is located between the network 3 and the reception terminal 2 and is closer to the reception terminal 2. Through a transmission path between the network 3 and the reception terminal 2, the information processing apparatus 1 receives the same stream as the stream of IP packet group transmitted to the reception terminal 2. From the received stream of IP packet group, the information processing apparatus 1 generates information for estimating a quality of each of the video frames constituting the video transmitted to the reception terminal 2. The information processing apparatus 1 transmits the generated information for estimating the quality of the video to the monitor server 4. A detail of the information processing apparatus 1 will be described below.

The monitor server 4 receives the information for estimating the quality of the video from the information processing apparatus 1.

The data stream flowing on the network 3 is a plurality of IP packet groups storing video and audio data. The IP packet group is generated in the following manner.

Figure 2:
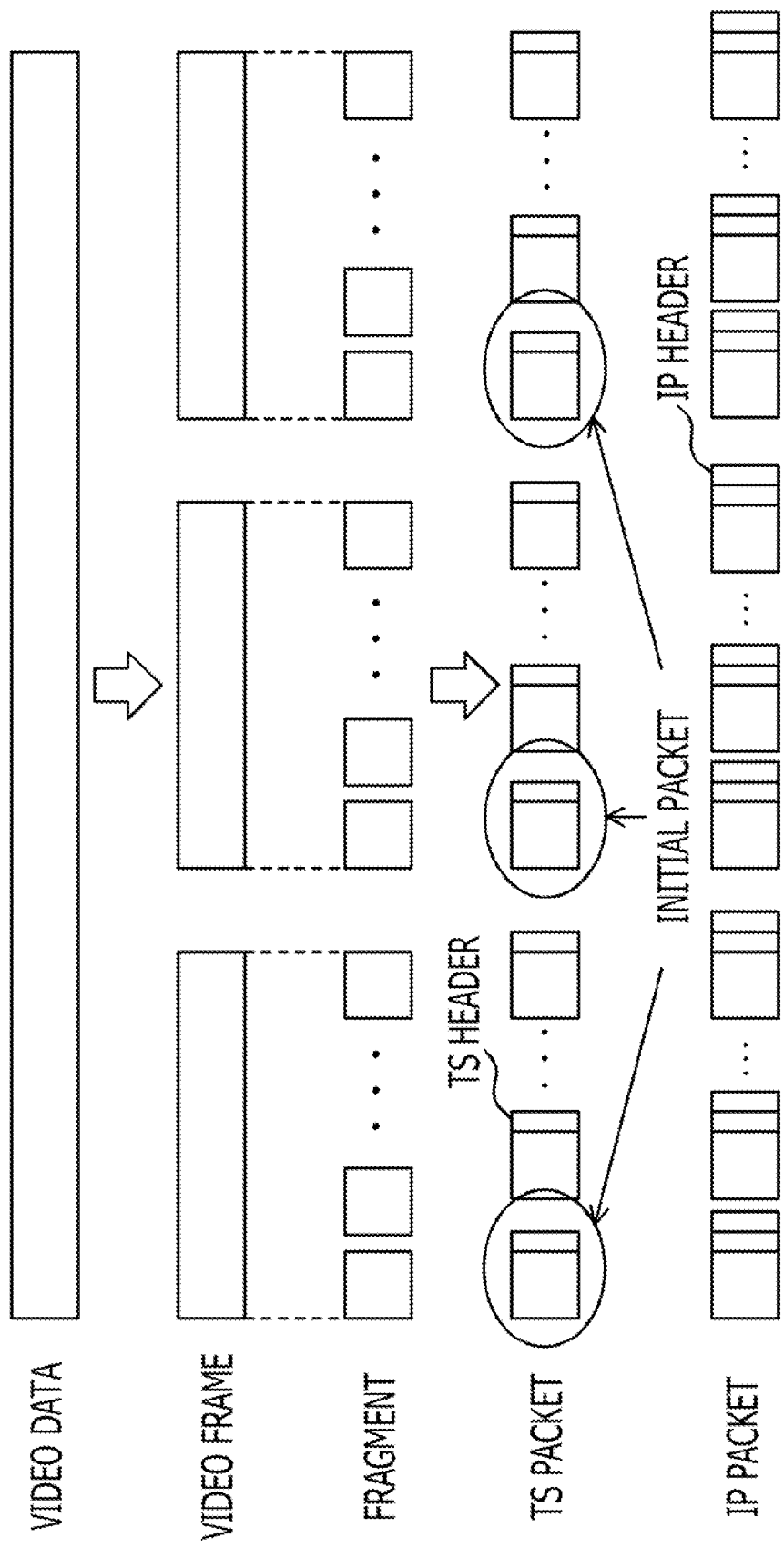
FIG. 2 illustrates an example of a packetization of video data based on MPEG-2 TS.

FIG. 2 illustrates an example of a packetization of video data based on MPEG-2 TS. MPEG-2 TS is a specification standard for multiplexing video and audio for transmission.

The content server 6 compresses and encodes the video and audio of the content that should be transmitted to the reception terminal 2, respectively, for example, on the basis of MPEG-2 video, MPEG-2 audio, and the like to generate a bit string. In the example illustrated in FIG. 2, the bit string of the compressed and encoded video is displayed. This bit string of the video is a set of a plurality of video frame data blocks corresponding to a plurality of video frames. The video frame refers to one image among a plurality of images constituting the video content.

The content server 6 divides the generated bit string of the video data into a predetermined size. For example, the generated bit string of the video is divided into each video frame.

The content server 6 further divides the respective video frames into a plurality of fragments and adds a TS header to each fragment to generate a TS packet. The TS packet including an initial byte of each video is referred to as "initial packet" according to the first embodiment.

The content server 6 further adds an IP header to each TS packet to generate an IP packet group. In a destination IP address of the IP header, an IP address of the video distribution server 5 is stored. The content server 6 transmits the generated IP packet group to the video distribution server 5.

When the video distribution server 5 receives the IP packet group from the content server 6, the video distribution server 5 removes the respective IP headers and the TS headers from the IP packet group and performs an encryption on the fragmented video data (pay load). This encryption is, for example, a security for allowing only subscribers for the video distribution service of the content server 6 to view the video. The video distribution server 5 assigns the TS header to each encrypted pay load again to generate the TS packet. The video distribution server 5 assigns the IP header in which an IP multicast for specifying the subscriber for the video distribution service of the content server 6 (including the reception terminal 2 and the information processing apparatus 1) is stored as a destination IP address to each TS packet to generate the IP packet group. The video distribution server 5 sends out the generated IP packet group to the network 3.

In the above-mentioned manner, the reception terminal 2 and the information processing apparatus 1 can receive the IP packet group from the network 3.

Configuration Example of the Information Processing Apparatus

The information processing apparatus 1 is, for example, a general-use computer such as a personal computer or a dedicated-use computer that generates the information for estimating the quality of the video. The information processing apparatus 1 includes an input unit 11, a processor 12, a storage unit 13, and an output unit 14.

The input unit 11 and the output unit 14 are network interfaces. The network interface is, for example, a LAN (Local Area Network) interface board or a wireless communication circuit for a wireless communication. The input unit 11 receives the IP packet group flowing on the network 3. The IP packet group input to the input unit 11 also includes the IP packet including the video data that is received by the reception terminal 2 connected to the network 3.

The input unit 11 performs a processing based on the IP header such as a change of the order of the received IP packets, for example. The input unit 11 changes the order of the IP packet groups of the video transmitted from the content server 6 in a reproduction order. Also, the input unit 11 removes the IP header of the received IP packet to be output to the processor 12. For example, the input unit 11 receives the IP packet including the TS (Transport Stream) packet for transmitting the video data, removes the IP header, and takes out the TS packet from the IP packet to be output to the processor 12.

The storage unit 13 holds a video quality estimation information generation program 13-3. The storage unit 13 is a main storage apparatus and/or an auxiliary storage apparatus, for example. The main storage apparatus includes, for example, a RAM (Random Access Memory) or a ROM (Read Only Memory). The auxiliary storage apparatus is, for example, an EPROM (Erasable Programmable ROM) or a hard disc drive (HDD). Also, the auxiliary storage apparatus may include a removable medium, that is, a portable recording medium. The removable medium is, for example, a disc recording medium such as a USB (Universal Serial Bus) memory or a CD (Compact Disc). The storage unit 13 has a reproduction importance level table 13-1 and a statistical information table 13-2. Details of the reproduction importance level table 13-1 and the statistical information table 13-2 will be described below.

The processor 12 is, for example, a CPU (Central Processing Unit) or a DSP (Data Signal Processor). The processor 12 executes various processings by executing an OS and various application programs held in the storage unit 13. The processor 12 can realize a TS packet reception unit 121, a header analysis unit 122, a packet count unit 123, a table management unit 124, and a reproduction quality estimation unit 125 by executing the video quality estimation information generation program 13-3 held in the storage unit 13.

The TS packet reception unit 121 (input unit) accepts only the TS packet among the packets received from the input unit 11 into the processor 12. The packet group input to the TS packet reception unit 121 is packet strings arranged in the reproduction order. The TS packet reception unit 121 outputs the TS packet to the header analysis unit 122.

To the header analysis unit 122 (calculation unit), the TS packet is input from the TS packet reception unit 121. The header analysis unit 122 analyzes the header of the TS packet.

Figure 3:
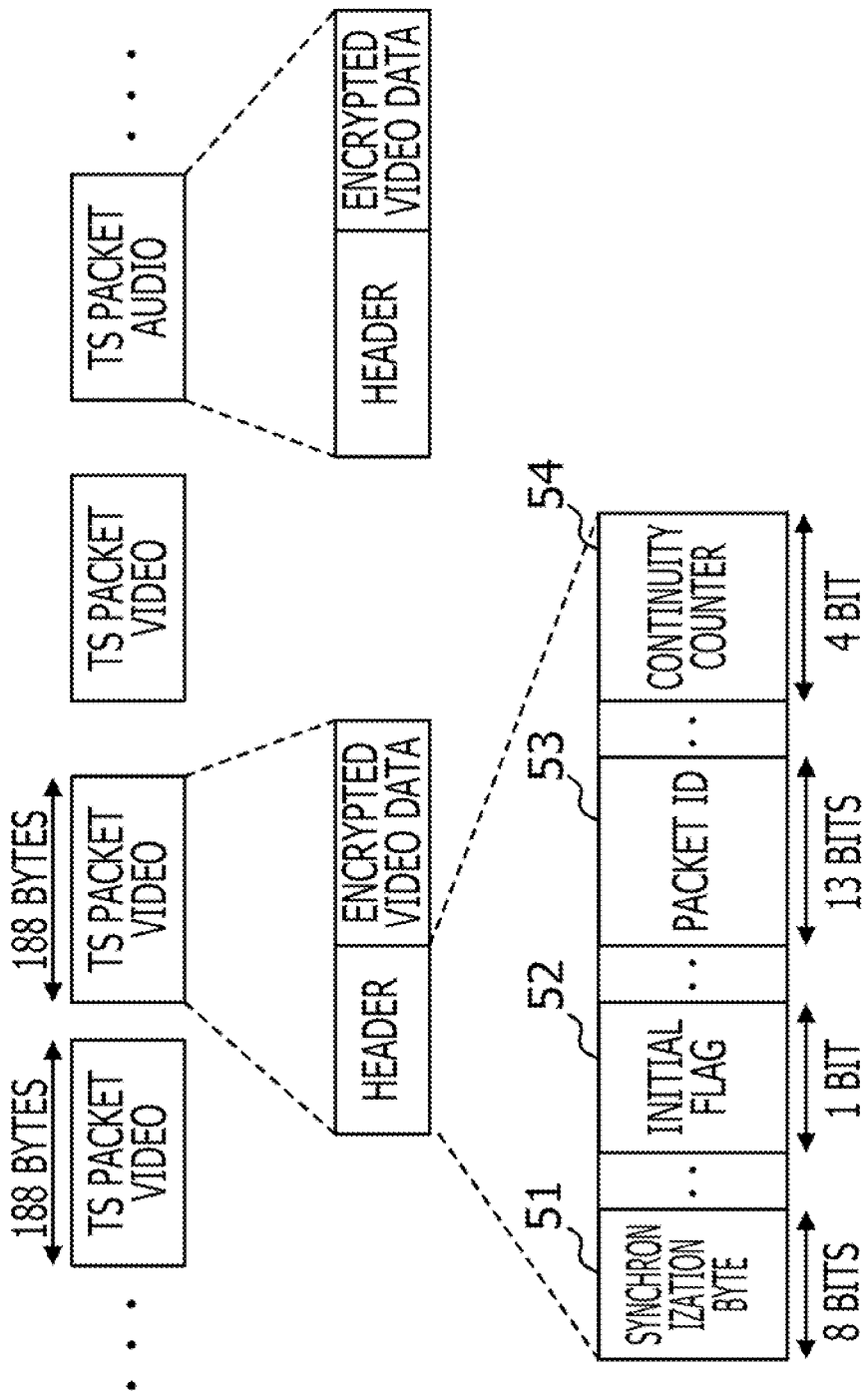
FIG. 3 is an explanatory diagram for describing a header format of a TS packet based on MPEG-2 TS.

FIG. 3 is an explanatory diagram for describing a header format of a TS packet based on MPEG-2 TS.

The TS packet based on MPEG-2 TS has a fixed length of 188 bytes. The TS packet has a header and a data part (pay load).

Examples of information contained in the header of the TS packet includes a synchronization byte 51, an initial flag 52, a packet ID 53, a continuity counter 54, and the like.

The synchronization byte 51 has 8 bits and indicates an initial byte of the TS packet. As the TS packet has the fixed length of 188 bytes, the synchronization byte 51 appears every 188 bytes.

The initial flag 52 has 1 bit and is an identifier indicating that the relevant TS packet is at the beginning of the frame as the initial packet of the video frame or the audio frame. That is, in a case where the initial flag 52 of a certain TS packet is, for example, "1", this indicates that the data part of the TS packet includes the initial byte of the video frame or the audio frame. Also, in a case where the initial flag 52 of the TS packet is, for example, "0", this indicates that the data part of the TS packet includes an intermediate part or trailing part of the video frame or the audio frame.

The packet ID (Packet Identifier) 53 has 13 bits. When the value indicated by the packet ID 53 is referred to with a PAT (Program Association Table) packet and a PMT (Program MAP Table) packet, for example, audio data, video data, or other data of which type of a program included in the data part of the relevant TS packet is indicated. The PAT packet has the packet ID of 0x0000 and is, for example, a packet including the packet ID corresponding to each program included in the stream of the TS packets. The PMT packet has the packet ID corresponding to one program among the programs included in the PAT packet and is a packet including the packet ID corresponding to the audio data, the video data, or the other data included in the program corresponding to the relevant packet ID. Each TS packet generated from the same video is assigned with the packet ID of the same value. For example, all the TS packets generated from the video included in a certain one content distributed from the content server 6 are assigned with the same packet ID. It should be noted that the PAT packet and the PMT packet are not encrypted.

The continuity counter 54 has four bits and indicates a continuity of the packets for each packet ID. The continuity counter is for values from 0 to 15 and is increased by 1 for each TS packet of the same packet ID. When the value of the continuity counter is 15, the value of the continuity counter of the TS packets of the next same packet IP is returned to 0.

Hereinafter, the TS packet storing the video data in the data part is referred to as "video packet", and the TS packet storing the audio packet in the data part is referred to as "audio packet".

The header analysis unit 122 identifies whether the TS packet is the video packet or the audio packet from the packet ID of the header of the received TS packet. Also, the header analysis unit 122 determines whether the initial flag of the header of the TS packet is "1" or "0" to determine whether the TS packet is the initial packet or not. Also, the header analysis unit 122 checks the continuity counter of the header of the TS packet to check the continuity of the received TS packet group. The check result of the continuity counter is not used according to the first embodiment. It should be noted that an embodiment where the check result of the continuity counter is used will be described below.

As a result of the analysis on the header of the TS packet, in a case where the TS packet is the video packet, the header analysis unit 122 outputs the analysis result on the header of the TS packet to the packet count unit 123.

To the packet count unit 123, the analysis result on the header of the TS packet that is the video packet is input from the header analysis unit 122. The packet count unit 123 counts the number of the video packets input from the header analysis unit 122 for each video frame. Also, the packet count unit 123 counts the number of video frames received by the information processing apparatus 1.

In a case where the video packet input from the header analysis unit 122 is the initial packet, the packet count unit 123 outputs the counted value of the video packets held by the packet count unit 123 at that time and the counted value of the video frames to the table management unit 124. Next, the packet count unit 123 resets the counted value of the video packets to 0 and counts the received initial packets. The counted value of the video packets is 1. Also, the packet count unit 123 adds 1 to the counted value of the video frames.

For example, in a case where the counted value of the video packets held by the packet count unit 123 is 50 and the counted value of the video frames is 15, the packet count unit 123 receives the initial packets. In this case, the packet count unit 123 outputs the counted value of the video packets held at that time which is 50 and the counted value of the video frames which is 15 to the table management unit 124. Next, the packet count unit 123 resets the counted value of the video packets to 0, counts the received initial packets, and adds 1 to the counted value of the video packets. Also, the packet count unit 123 adds 1 to the counted value of the video frames and sets the counted value as 16.

The table management unit 124 receives the counted value of the video packets and the counted value of the video frames from the packet count unit 123. The table management unit 124 manages the reproduction importance level table 13-1 and the statistical information table 13-2 held in the storage unit 13, on the basis of the counted value of the video packets and the counted value of the video frames input from the packet count unit 123.

FIG. 4 illustrates an example of a statistical information table. The statistical information table illustrated in FIG. 4 stores the counted value of the video frames input from the packet count unit 123 as a frame number. Also, the counted value of the video packets is associated with a frame number indicating the counted value of the video frames which are also input to be stored as a packet number of the relevant video frame.

When a counted value of the video packets and a counted value n of the video frames (natural number that does not include 0) is input from the packet count unit 123, the table management unit 124 records the counted value n of the video frames in the statistical information table 13-2 as the frame number. Also, the table management unit 124 records the counted value of the video packets as the packet number included in the video frame of a frame number n in the statistical information table 13-2. The frame number is a number for the information processing apparatus 1 to identify the video frame within the information processing apparatus 1.

FIG. 5 illustrates an example of a reproduction importance level table. In the reproduction importance level table, evaluation values previously assigned to the video frames by an administrator or the like are set stepwise in accordance with the number of packets. The evaluation values previously assigned to the video frames are information for estimating the video frames. The evaluation values include, for example, reproduction importance levels, degradation quality values, and the like. The reproduction importance levels are values indicating the reproduction importance levels of the respective video frames. The degradation quality values are values indicating influence levels affecting on the quality of the video in a case where the video frame is lost during the transmission.

In the example illustrated in FIG. 5, the number of packets are divided into three stages of 0 to P1, P1+1 to P2, and P2+1 or more, and these are respectively assigned with reproduction importance levels X1, X2, and X3. Each of P1 and P2 is a natural number not including 0, and P1<P2 is established.

A state in which the number of video packets included in the video frame is large indicates that the information amount that the relevant video frame has is large and the importance level of the relevant video frame in the video is high. Thus, in the example illustrated in FIG. 5, the larger number of packets (counted value) is assigned with a larger reproduction importance level. That is, in the example illustrated in FIG. 5, the reproduction importance levels are assigned to establish X1<X2<X3.

Also, together with the reproduction importance levels, the degradation quality values can also be assigned in accordance with the number of packets. The degradation quality values are values indicating degrees of the influence affecting on the quality of the video in a case where a certain video frame is lost. It is conceivable that as the number of packets (counted value) is larger, the influence affecting on the quality of the video is larger in a case where the relevant video frame is lost. Thus, the degradation quality value is assigned with the larger value as the number of packets is larger like the reproduction importance levels. In the example illustrated in FIG. 5, the video frame in which the number of packets is 0 to P1 is assigned with the degradation quality values D1. Furthermore, the video frame in which the number of packets is P1+1 to P2 is assigned with the degradation quality values D2. Then, the video frame in which the number of packets is P2+1 or more is assigned with the degradation quality values D3. Also, the degradation quality values establish D1<D2<D3.

The table management unit 124 classifies the video frame n in accordance with the number of video packets included in the video frame while following the reproduction importance level table. It should be noted that the number n of the video frame is the same number as the frame number held in the statistical information table 13-2.

The reproduction quality estimation unit 125 monitors the reproduction importance level table 13-1. When information on the video frame is newly added in the reproduction importance level table 13-1, the reproduction quality estimation unit 125 reads out the reproduction importance level of the added video frame from the reproduction importance level table 13-1 to be transmitted through the output unit 14 to the monitor server 4. Also, for example, the reproduction quality estimation unit 125 may periodically read out the reproduction importance levels of the respective video frames received by the information processing apparatus 1 from the reproduction importance level table 13-1 during a predetermined period of time to be transmitted to the monitor server 4. The reproduction importance levels transmitted to the monitor server 4 are displayed, for example, on a display. In the monitor server 4, it is possible to determine the reproduction importance levels of the respective video frames included in the video transmitted from the content server 6 to the reception terminal 2.

The information processing apparatus 1 further includes an input apparatus such as a key board or a pointing device and an output apparatus such as a display apparatus or a printer as peripheral apparatuses, for example. Also, the input apparatus can include an input apparatus like a camera for a video or an image and an audio input apparatus like a microphone, for example. Also, for example, the output apparatus can include an audio output apparatus like a speaker.

Processing Flow of the Information Processing Apparatus

Figure 6:
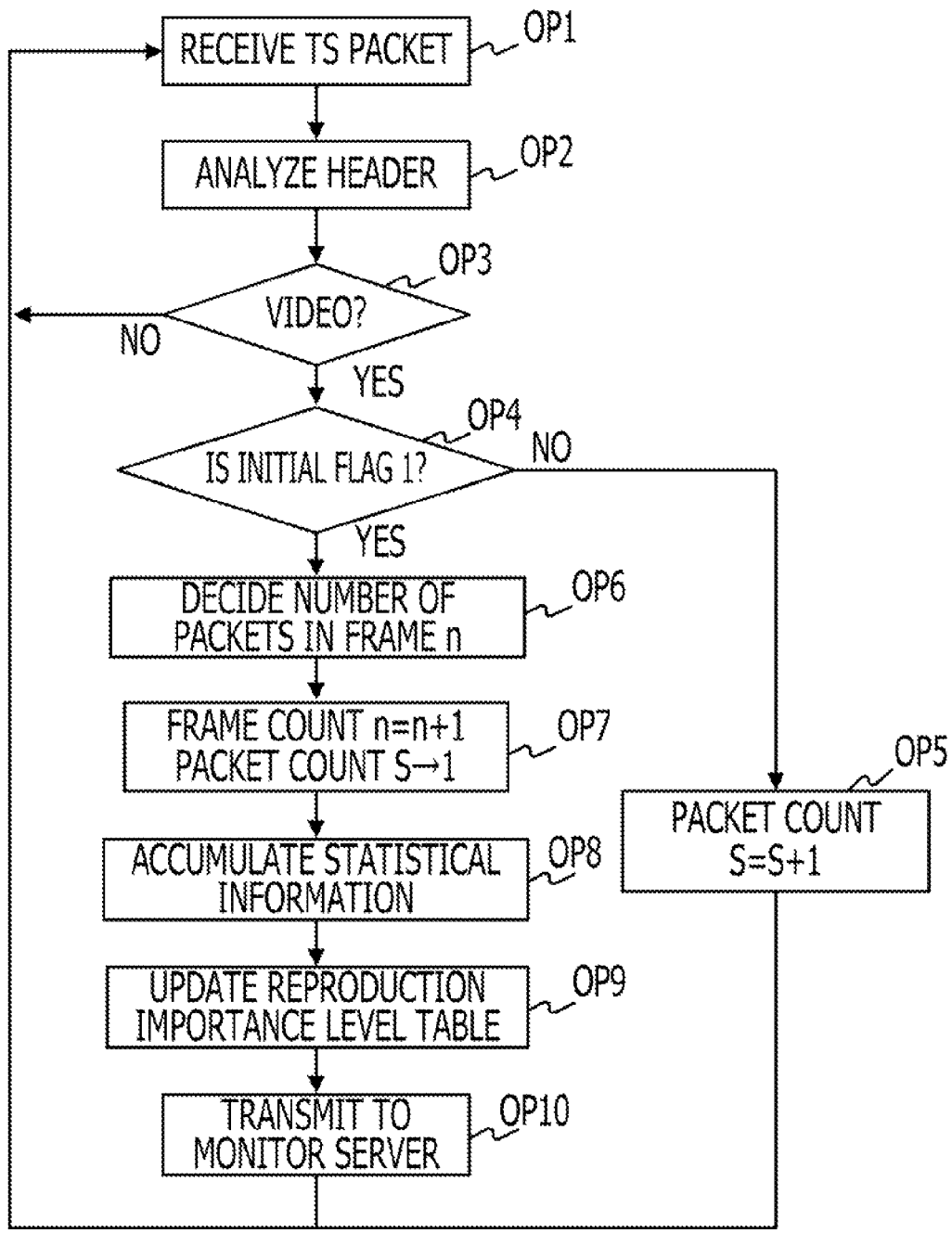
FIG. 6 illustrates an example of a processing flow of the information processing apparatus.

FIG. 6 illustrates an example of a processing flow of the information processing apparatus 1. The input unit 11 of the information processing apparatus 1 receives the IP packets flowing on the network 3. The input unit 11 removes the TS packet from the received IP packets to be output to the TS packet reception unit 121. The TS packet reception unit 121 receives the TS packet from the input unit 11 (OP1). The TS packet reception unit 121 outputs the TS packet to the header analysis unit 122.

The header analysis unit 122 analyzes the header of the TS packet input from the TS packet reception unit 121 (OP2). The header analysis unit 122 analyzes the packet ID of the header of the TS packet to identify whether the relevant TS packet is the video packet or the audio packet (OP3). In a case where the TS packet is the audio packet (OP3: No), the processing returns to OP1.

In a case where the TS packet is the video packet (OP3: Yes), the header analysis unit 122 determines whether or not the relevant TS packet is the initial packet of the video frame on the basis of the initial flag of the header of the TS packet (OP4). That is, the header analysis unit 122 determines whether or not the initial flag in the header of the TS packet is "1". The header analysis unit 122 outputs the analysis result to the packet count unit 123.

The packet count unit 123 receives the analysis result on the initial flag of the header of the TS packet from the header analysis unit 122. In a case where the TS packet is not the initial packet (OP4: No), the packet count unit 123 adds 1 to a counted value S of the video packets (in FIG. 5, packet count, that is, a value of the counter for counting the number of packets, S is an integer greater than or equal to 0) (OP5). That is, in a case where the initial flag of the header of the TS packet is "0", the packet count unit 123 adds 1 to the counted value S of the video packets. After that, the processing returns to OP1. The initial value of the counted value S of the video packets is 0.

In a case where the TS packet is the initial packet (OP4: Yes), the packet count unit 123 decides the number of packets S in the video frame n on the basis of the counted value S of the video packets and the counted value n of the video frames held at that time by the packet count unit 123 (OP6). The counted value n of the frames is represented as a frame count in FIG. 5 and is a value of the counter for counting the number of frames. The packet count unit 123 outputs the decided number of packets S in the video frame n to the table management unit 124.

Next, the packet count unit 123 sets the counted value S of the video packets as 1 (OP7). Also, the packet count unit 123 adds 1 to, the counted value n of the video frames (OP7).

The table management unit 124 receives the number of packets S in the video frame n from the packet count unit 123. The table management unit 124 records the number of packets S included in the video frame n in the statistical information table 13-2 (OP8, see FIG. 4).

Next, the table management unit 124 records an identification number n of the video packet in the reproduction importance level table 13-1 in accordance with the number of packets (updates the reproduction importance level table 13-1) (OP9, see FIG. 5).

When the reproduction importance level table 13-1 is updated, the reproduction quality estimation unit 125 reads out the reproduction importance level of the video frame n from the reproduction importance level table 13-1 to be output to the monitor server 4 (OP10). After that, the processing returns to OP1

Actions and Effects of the First Embodiment

The information processing apparatus 1 receives the same video packet as the video packet received by the reception terminal 2 flowing on the network 3, estimates the number of packets included in the video packet on the basis of the header of the video packet, and assigns the reproduction importance level to the video frame in accordance with the number of packets. According to the information processing apparatus 1, with the information on the header of the video packet, without restoring the video frame from the video packet group, it is possible to efficiently assign the reproduction importance levels (information for estimating the quality of the video, video quality estimation information) to the video frame.

Also, even in a case where the data stored in the data part of the TS packet is encrypted, the information processing apparatus 1 can appropriately assign the reproduction importance level to the video frame by analyzing the header of the non-encrypted TS packet.

According to the first embodiment, in accordance with the number of packets in the video frame, in the reproduction importance level table 13-1, the video frames are classified, and the reproduction importance levels are decided. Instead of this, the reproduction importance level table 13-1 may assign an identifier of the group in accordance with the number of packets as the reproduction importance level instead of the numeric value. That is, the information for estimating the quality of the video generated for each of the video frame (the evaluation value, the reproduction importance level, the degradation quality value) is not limited to a numeric value but may also be a alphanumeric character or the like used as an identifier for the group in accordance with the number of the packets.

Also, according to the first embodiment, when the reproduction importance level table 13-1 is updated, the reproduction quality estimation unit 125 reads out the reproduction importance level of the newly added video frame from the reproduction importance level table 13-1 to be transmitted to the monitor server 4. Instead of this, the reproduction quality estimation unit 125 transmits the reproduction importance level table 13-1 to a display (not illustrated in the drawing) that is provided to the information processing apparatus 1, and the transmitted reproduction importance level table 13-1 may be displayed on the display.

Second Embodiment

According to a second embodiment, in a case where the video packet which is lost during the transmission exists, the information processing apparatus 1 detects the loss of the video packet and assigns the degree affecting the quality of the video by the loss of the video packet as the evaluation value. According to the second embodiment, a case is supposed in which the initial packet is not lost. It should be noted that according to the second embodiment, a description of a part substantially common to the first embodiment will be omitted.

Configuration Example of the Information Processing Apparatus

Figure 7:
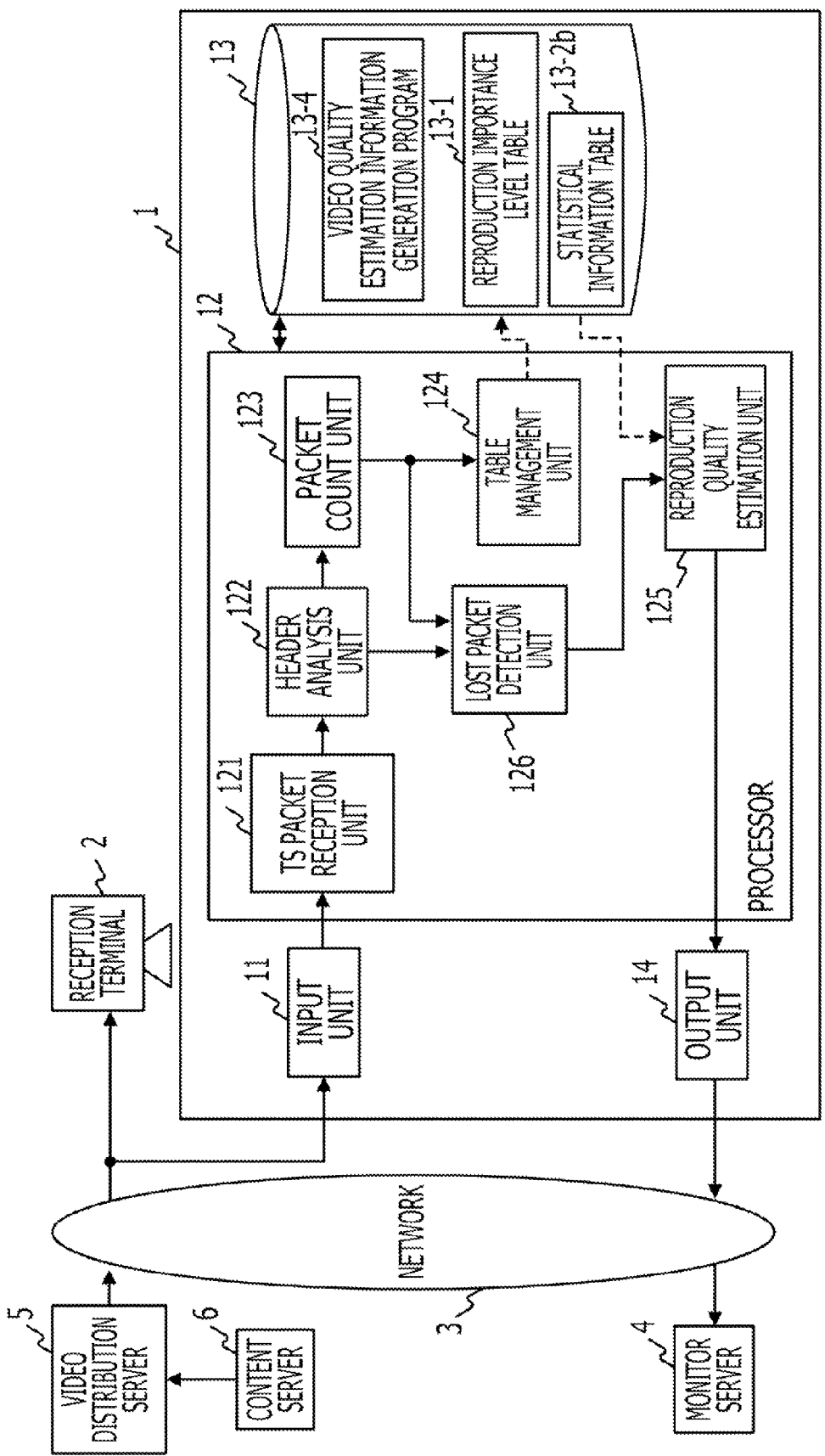
FIG. 7 illustrates a configuration example of the information processing apparatus.

FIG. 7 illustrates a configuration example of the information processing apparatus 1 according to the second embodiment. According to the second embodiment, substantially similar as in the first embodiment, the information processing apparatus 1 is provided with the input unit 11, the processor 12, the storage unit 13, and the output unit 14. The storage unit 13 holds a video quality estimation information generation program 13-4.

By executing the video quality estimation information generation program 13-4 held in the storage unit 13, the processor 12 can further realize a lost packet detection unit 126 in addition to the TS packet reception unit 121, the header analysis unit 122, the packet count unit 123, the table management unit 124, and the reproduction quality estimation unit 125 described according to the first embodiment.

When the TS packet is input, the TS packet reception unit 121 accumulates the TS packet in a buffer provided in a storage area of the storage unit 13.

Substantially similar as in the first embodiment, when the TS packet is received, on the basis of the header of the TS packet, the header analysis unit 122 analyzes the initial flag, the packet ID, and the continuity counter. The header analysis unit 122 detects the loss of the TS packet by analyzing the continuity counter of the TS packets in addition to the processing described according to the first embodiment.

For example, the header analysis unit 122 detects the loss of the TS packet in the following manner. The header analysis unit 122 determines whether or not the value represented by the continuity counter of the received TS packets is the value obtaining by adding 1 to the value represented by the continuity counter of the immediately preceding TS packets having the same packet ID. That is, the header analysis unit 122 determines whether or not the values of the continuity counter of the received TS packet and the immediately preceding TS packet having the same packet ID are continuous. In a case where the values of the continuity counter of the received TS packet and the immediately preceding TS packet are continuous, the header analysis unit 122 determines that no loss of the TS packet occurs. In a case where the values of the continuity counter of the received TS packet and the immediately preceding TS packet are not continuous, the header analysis unit 122 determines that the loss of the TS packet occurs.

In a case where the loss of the TS packet is detected, the header analysis unit 122 notifies the lost packet detection unit 126 of the loss of the TS packet.

Substantially Similar as in the processing described according to the first embodiment, in a case where the TS packet is the initial packet, the packet count unit 123 outputs the counted value of the video packets and the counted value of the video frames held at that time to the table management unit 124 and the lost packet detection unit 126.

The lost packet detection unit 126 receives notification on the loss of the TS packet from the header analysis unit 122. The lost packet detection unit 126 analyzes the TS packets accumulated in the buffer of the storage unit 13 and detects the number of the lost TS packets.

Also, when the counted value of the video packets and the counted value of the video frames are received from the packet count unit 123, the lost packet detection unit 126 obtains a total number of packets in the relevant video frame including the number of the lost TS packets.

Figure 8:
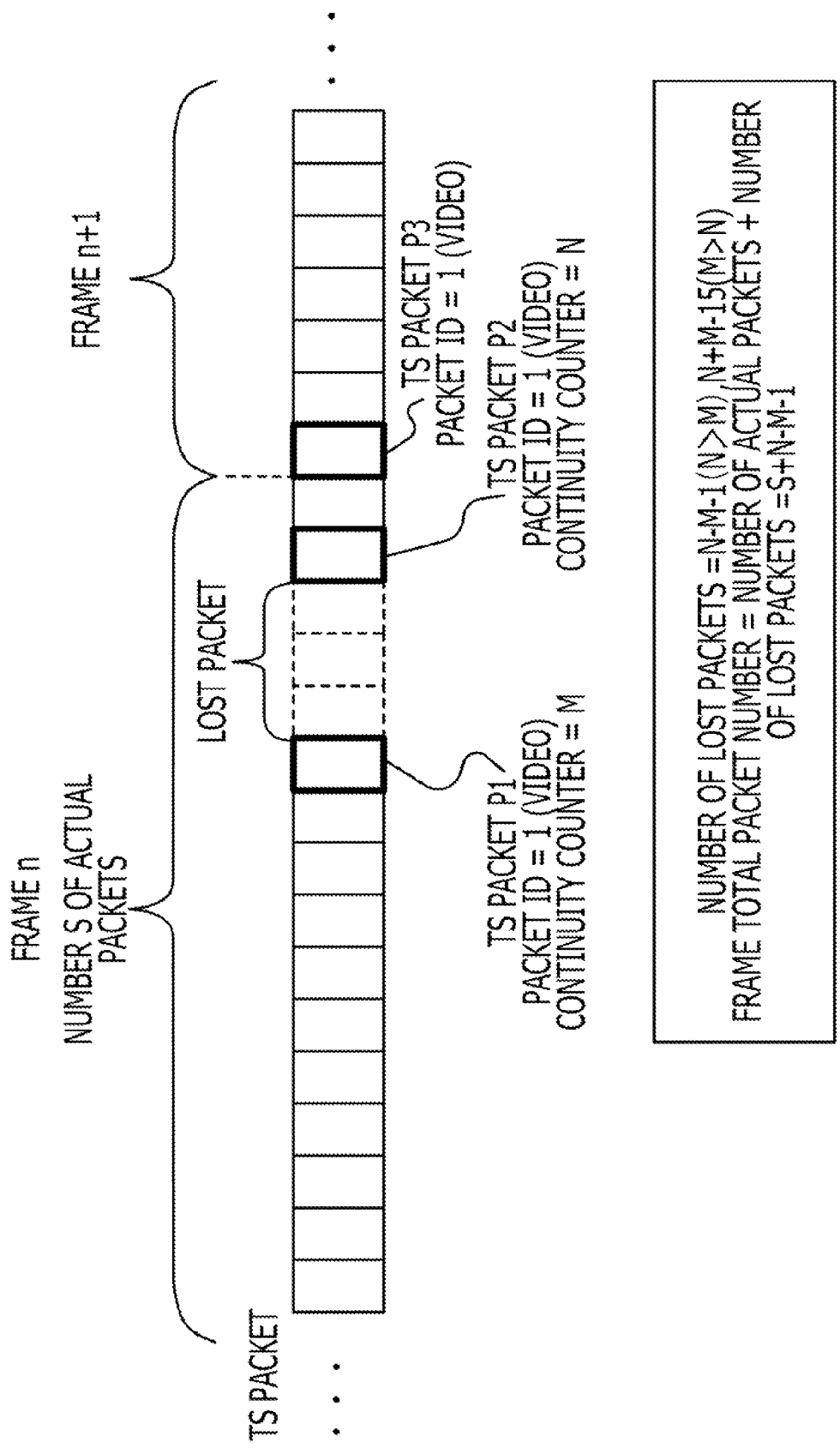
FIG. 8 illustrates examples of a processing of detecting the number of lost packets and a processing of calculating the total packets in a video frame including the lost packets.

FIG. 8 illustrates examples of a processing of detecting the number of lost packets by the lost packet detection unit 126 and a processing of calculating the total number of packets of the video frames including the lost packets. In the example illustrated in FIG. 8, a case is illustrated in which several packets are lost among the video frame included in the video frame n.

In the example illustrated in FIG. 8, the value of the continuity counter for the TS packet P1 included in the video frame n is M (M is an integer greater than or equal to 0). The value of the continuity counter for the TS packet P2 after the TS packet P1 is N (N is an integer greater than or equal to 0). The value of the continuity counter M for the TS packet P1 and the value of the continuity counter N for the TS packet are not continuous, and the header analysis unit 122 detects that the TS packet is lost between the TS packet P1 and the TS packet P2.

Also, both the TS packet P1 and the TS packet P2 have the same packet ID and are the video packets. Also, both the TS packet P1 and the TS packet P2 are not the initial packets.

When the lost packet detection unit 126 is notified from the header analysis unit 122 that the lost packet is detected between the TS packet P1 and the TS packet P2, the lost packet detection unit 126 reads out the TS packet P1 and the TS packet P2 held in the buffer of the storage unit 13. The lost packet detection unit 126 detects the number of lost packets on the basis of the value M indicated by the continuity counter of the TS packets P1 and the value N indicated by the continuity counter of the TS packets P2. In the case of M<N, the lost packet detection unit 126 subtracts the value of the continuity counter M for the TS packet P1 from the value of the continuity counter N for the TS packet P2 and further subtracts 1 to detect the number of lost packets. In the case of M≧N, the lost packet detection unit 126 subtracts the value of the continuity counter M for the TS packet P1 from 15 and adds the value of the continuity counter N for the TS packet P2 to detect the number of lost packets.

Number of lost packets=$N-M-1$ (in the case of $M<N$)

Number of lost packets=$15-M+N$ (in the case of $M \geq N$)

The lost packet detection unit 126 holds the detected number of lost packets. The lost packet detection unit 126 receives the counted value n of the video frames and the counted value S of the video packets from the packet count unit 123. The counted value S of the video packets received from the packet count unit 123 is the number of actual packets of the video packets actually received by the information processing apparatus 1. The lost packet detection unit 126 obtains the total number of packets in the video frame including the number of lost packets. It should be noted that the video frame n in FIG. 8 is the video frame to be lost as the packet is lost.

The lost packet detection unit 126 adds the number S of the actual packets in the video frame n with the number of lost packets to calculate the total number of packets in the video frame.

The total number of packets in the video frame=the number $S$ of actual packets+the number of lost packets The lost packet detection unit 126 outputs the calculated total number of packets in the video frame n to the reproduction quality estimation unit 125.

When the total number of packets in the video frame is received from the lost packet detection unit 126, the reproduction quality estimation unit 125 reads out the degradation quality value of the video frame n in accordance with the number of total packets from the reproduction importance level table to be transmitted through the output unit 14 to the monitor server 4.

In the monitor server 4, the degradation quality value of the video frame is received. The monitor server 4 adds, for example, the received degradation quality value of the video frame and estimates the quality of the video received by the reception terminal 2 on the basis of the added degradation quality value.

Processing Flow of the Information Processing Apparatus

Figure 9A:
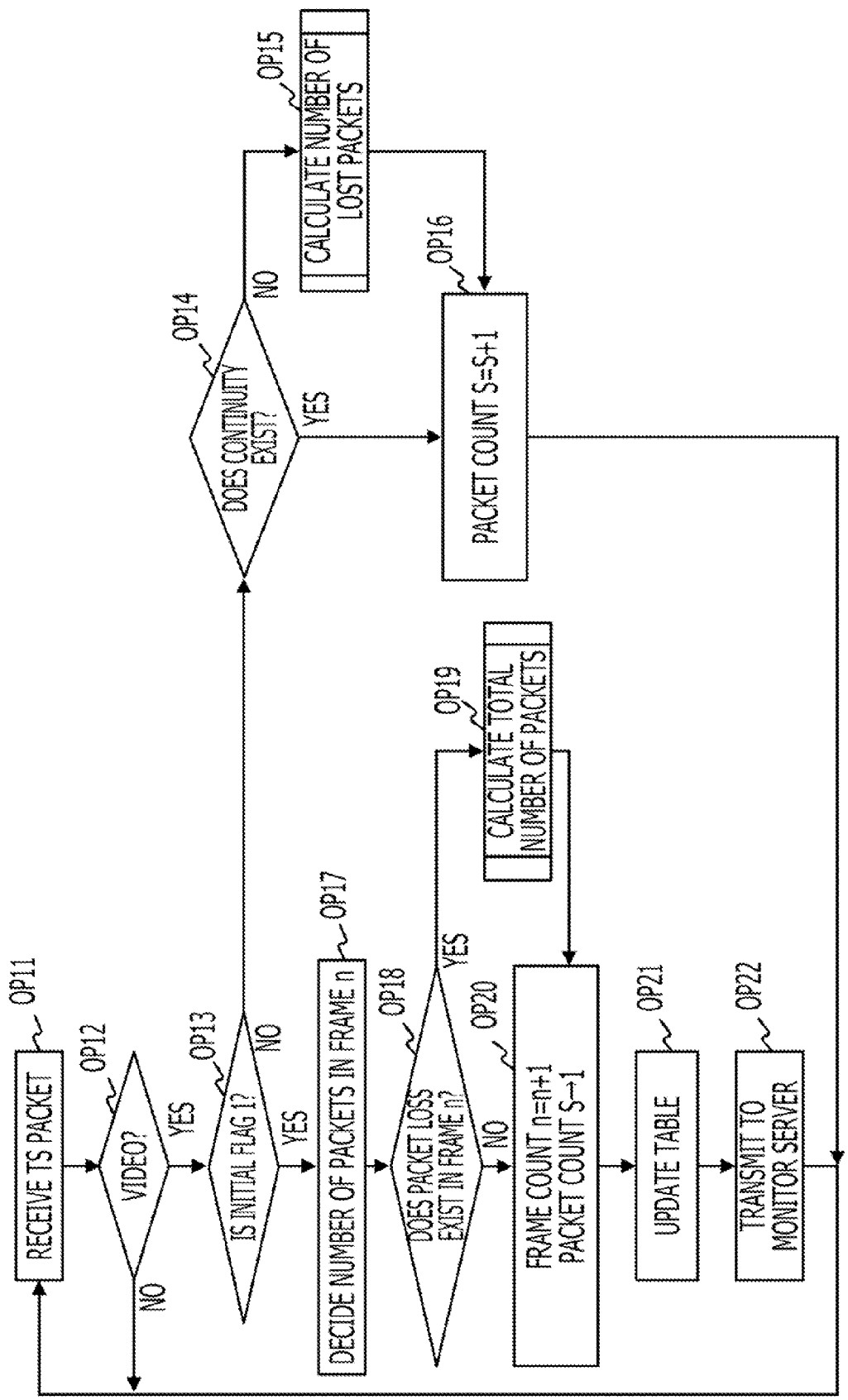
FIG. 9A illustrates an example of the processing flow of the information processing apparatus.
Figure 9B:
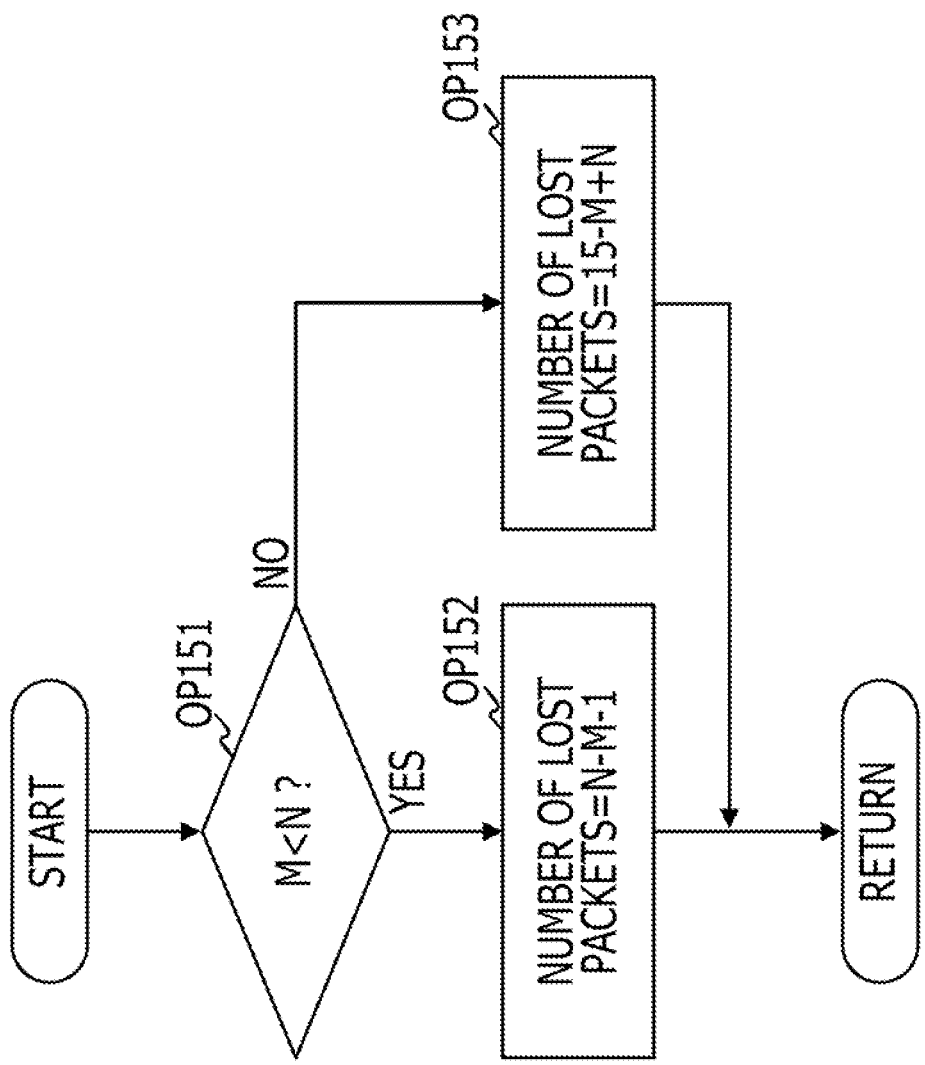
FIG. 9B illustrates an example of the processing flow of the information processing apparatus.
Figure 9C:
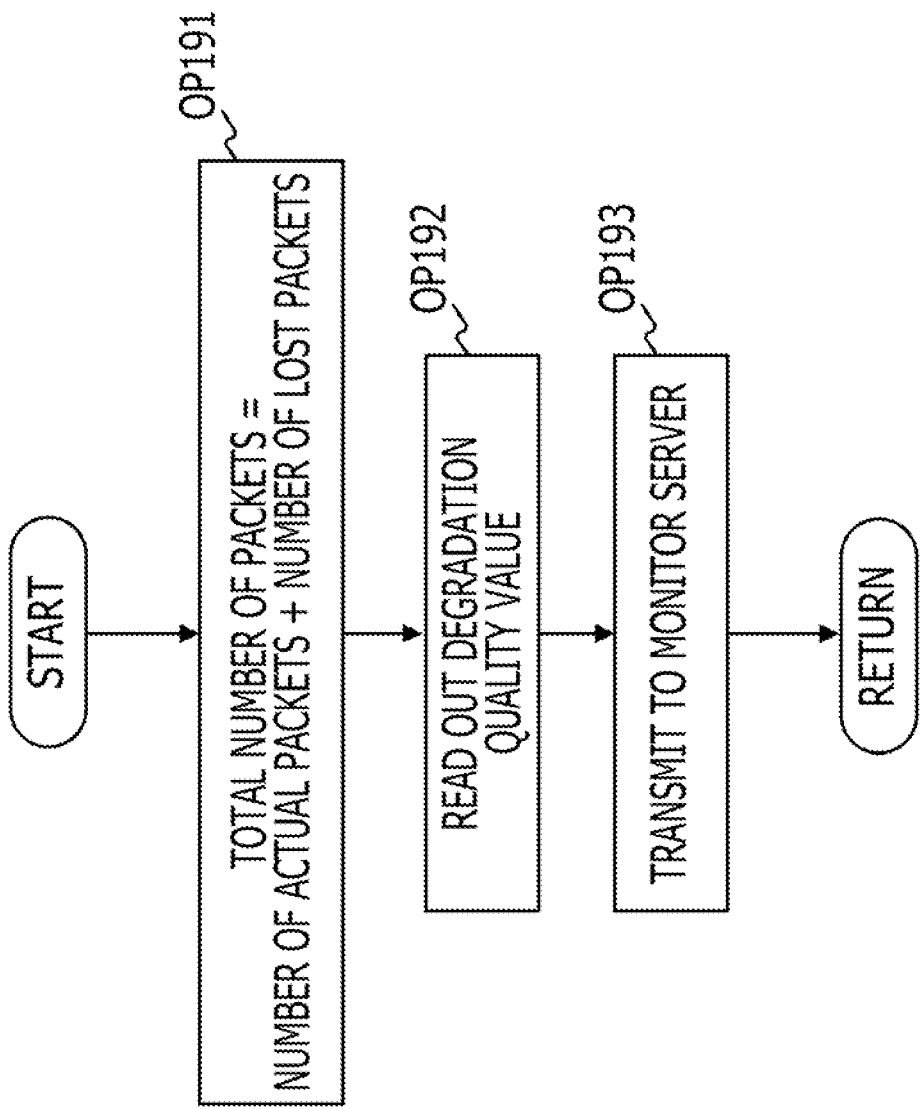
FIG. 9C illustrates an example of the processing flow of the information processing apparatus.

FIG. 9A, FIG. 9B, and FIG. 9C illustrate examples of the processing flow of the information processing apparatus 1. The processing in a case where the lost packet does not exist is substantially similar to that of the first embodiment, and a description will be given of a case where the lost packet is detected. Also, hereinafter, a description will be given of a case where the TS packet P2 and the TS packet P3 in the example illustrated in FIG. 8 are processed.

The TS packet reception unit 121 receives the TS packet P2 thought the input unit 11 (OP11). The TS packet reception unit 121 outputs the TS packet P2 to the header analysis unit 122.

The header analysis unit 122 analyzes the header of the TS packet P2 input from the TS packet reception unit 121. The header analysis unit 122 determines whether the TS packet P2 is the video packet or the audio packet on the basis of the packet ID of the header of the TS packet P2 (OP12). For example, when a value "1" of the packet ID is set as a value indicating the video packet, the TS packet P2 is the video packet (OP12: Yes), and next, the header analysis unit 122 determines whether or not the initial flag of the TS packet P2 is "1". That is, the header analysis unit 122 determines whether or not the TS packet P2 is the initial packet (OP13).

As the TS packet P2 is not the initial packet (OP13: No), the header analysis unit 122 next determines whether or not the lost packet exists on the basis of the respective continuity counters of the TS packets P2 and the TS packets P1 immediately before the TS packets P2 (OP14). That is, the header analysis unit 122 determines whether or not the value of the continuity counter M for the TS packet P1 and the value of the continuity counter N for the TS packet P2 are continuous values. In the example illustrated in FIG. 8, the value of the continuity counter M for the TS packet P1 and the value of the continuity counter N for the TS packet P2 are not continuous values, and thus the header analysis unit 122 determines that no continuity exists, that is, the lost packet exists (OP14: No). The header analysis unit 122 notifies the lost packet detection unit 126 that the lost packet exists between the TS packet P1 and the TS packet P2. Also, the header analysis unit 122 outputs the analysis result on the header of the TS packet P2 to the packet count unit 123.

When the lost packet detection unit 126 is notified from the header analysis unit 122 that the lost packet exists between the TS packet P1 and the TS packet P2, the lost packet detection unit 126 detects the number of lost packets (OP15).

The lost packet detection unit 126 determines whether or not the value N indicated by the continuity counter of the TS packets P2 is larger than the value M indicated by the continuity counter of the TS packets P1 (FIG. 9B, OP151). In a case where the value N indicated by the continuity counter of the TS packets P2 is greater than the value M indicated by the continuity counter of the TS packets P1 (OP151: Yes), the lost packet detection unit 126 obtains the number of lost packets=N−M−1 (OP152). The lost packet detection unit 126 holds the number of lost packets.

In a case where the value N indicated by the continuity counter of the TS packets P2 is less than or equal to the value M indicated by the continuity counter of the TS packets P1 (OP151: No), the lost packet detection unit 126 obtains the number of lost packets=15−M+N (OP153). The lost packet detection unit 126 holds the number of lost packets.

When the analysis result on the header of the TS packet P2 is received from the header analysis unit 122, the packet count unit 123 adds 1 to the counted value S of the video packets in the video frame n as the TS packet P2 is not the initial packet on the basis of the analysis result on the header (FIG. 9A, OP16). After that, the processing returns to OP11.

Subsequently, in the example illustrated in FIG. 8, a case will be described in which the TS packet P3 that is the initial packet in a video frame n+1 which follows the video frame n is processed.

The TS packet reception unit 121 receives the TS packet P3 through the input unit 11 (OP11). The TS packet reception unit 121 outputs the TS packet P3 to the header analysis unit 122.

The header analysis unit 122 analyzes the header of the TS packet P3 input from the TS packet reception unit 121. The header analysis unit 122 determines whether the TS packet P3 is the video packet or the audio packet on the basis of the packet ID of the header of the TS packet P3 (OP12). For example, if a value "2" of the packet ID indicates the video packet, as the TS packet is the video packet (OP12: Yes), the header analysis unit 122 determines next whether or not the TS packet P3 is the initial packet (OP13). As the TS packet P3 is the initial packet (OP13: Yes), the header analysis unit 122 outputs the analysis result on the header of the TS packet P3 to the packet count unit 123, and the processing progresses to OP17.

When the analysis result including the notification indicating that the TS packet P3 is the initial packet is received from the header analysis unit 122, the packet count unit 123 decides the number of packets S in the video frame n on the basis of the counted value S of the video packets and the counted value n of the video frames held at that time (OP17). The packet count unit 123 outputs the number of packets S in the video frame n to the table management unit 124 and the lost packet detection unit 126.

In the video frame n, the loss of the packet is detected between the TS packet P1 and the TS packet P2 (OP18: Yes). Therefore, the lost packet detection unit 126 calculates the total number of packets in the video frame when the number of packets S in the video frame n is received from the table management unit 124 (OP19).

The lost packet detection unit 126 adds the number of lost packets held in the received number of packets S in the video frame n to calculate the total number of packets in the video frame (FIG. 9C, OP191). The lost packet detection unit 126 outputs the calculated total number of packets in the video frame n to the reproduction quality estimation unit 125.

When the total number of packets in the video frame is received from the lost packet detection unit 126, the reproduction quality estimation unit 125 refers to the reproduction importance level table 13-1 and reads out the degradation quality values in accordance with the total number of packets in the video frame n (OP192).

The reproduction quality estimation unit 125 transmits the degradation quality value of the video frame n to the monitor server 4 through the output unit 14 (OP193).

Next, the packet count unit 123 sets the counted value S of the video packets as 1. Also, the packet count unit 123 adds 1 to, the counted value n of the video frames (FIG. 9A, OP20).

When the number of packets S in the video frame n is received from the packet count unit 123, the table management unit 124 records the number of packets S in the statistical information table 13-2 and classifies the video frame n in accordance with the total number of packets in the video frame n to be recorded in the reproduction importance level table 13-1 (OP21).

When the reproduction importance level table 13-1 is updated, the reproduction quality estimation unit 125 reads out the reproduction importance level of the video frame n from the reproduction importance level table 13-1 to be output to the monitor server 4 (OP22). After that, the processing returns to OP11.

Actions and Effects of the Second Embodiment

The information processing apparatus 1 according to the second embodiment analyzes the header of the received TS packet and detects the loss of the TS packet in a case where the values of the continuity counter are not continuous. According to the information processing apparatus 1, without restoring the video frame from the received TS packet, by analyzing the header of the TS packet, it is possible to detect the loss of the TS packet and the number of lost packets. Also, according to the information processing apparatus 1, the number of lost packets is detected so that the total number of packets in the video frame including the lost packet can be calculated, and in accordance with the total number of packets, the degradation quality value can be assigned to the video frame including the lost packet (quality estimation information can be generated). As the degradation quality value is assigned to the video frame including the lost packet to be distributed on the network 3, it is possible to estimate the quality of the video received by the reception terminal 2.

Also, the video frame group having the periodicity in the size of the video frames is distributed on the network 3, and even in a case where the period suddenly changes, the information processing apparatus 1 according to the second embodiment can assign the evaluation values to the lost video frame and the respective video frame. The video frame groups having the periodicity of the size of the video frames includes video frame groups such as, for example, the I picture, P picture, and B picture of MPEG-2. Also, in a case where the periodicity of the size of the video frame suddenly changes, for example, in a service distributing the IPTV, a case exists in which the video is switched from a program to a commercial film. On the basis of the information the header of the received TS packets, the information processing apparatus 1 detects the total number of packets included in the video frame including the lost packet and assigns the degradation quality value in accordance with the total number of packets, so that even in a case where the periodicity of the size of the video frame (the number of packets) suddenly changes, it is possible to appropriately assign the evaluation value to the video frame.

Third Embodiment

The information processing apparatus according to a third embodiment monitors a periodicity of the number of the packets included in the video frame and detects the loss of the video packet. According to the third embodiment, it is assumed that the frame rate of the video distributed on the network 3 is 30 fps, for example. Also, according to the second embodiment, the loss of the initial packet is not supposed, but according to the third embodiment, the packet loss including an occurrence of the initial packet loss is supposed. It should be noted that according to the third embodiment, a description substantially common to the first embodiment and the second embodiment will be omitted.

Figure 10:
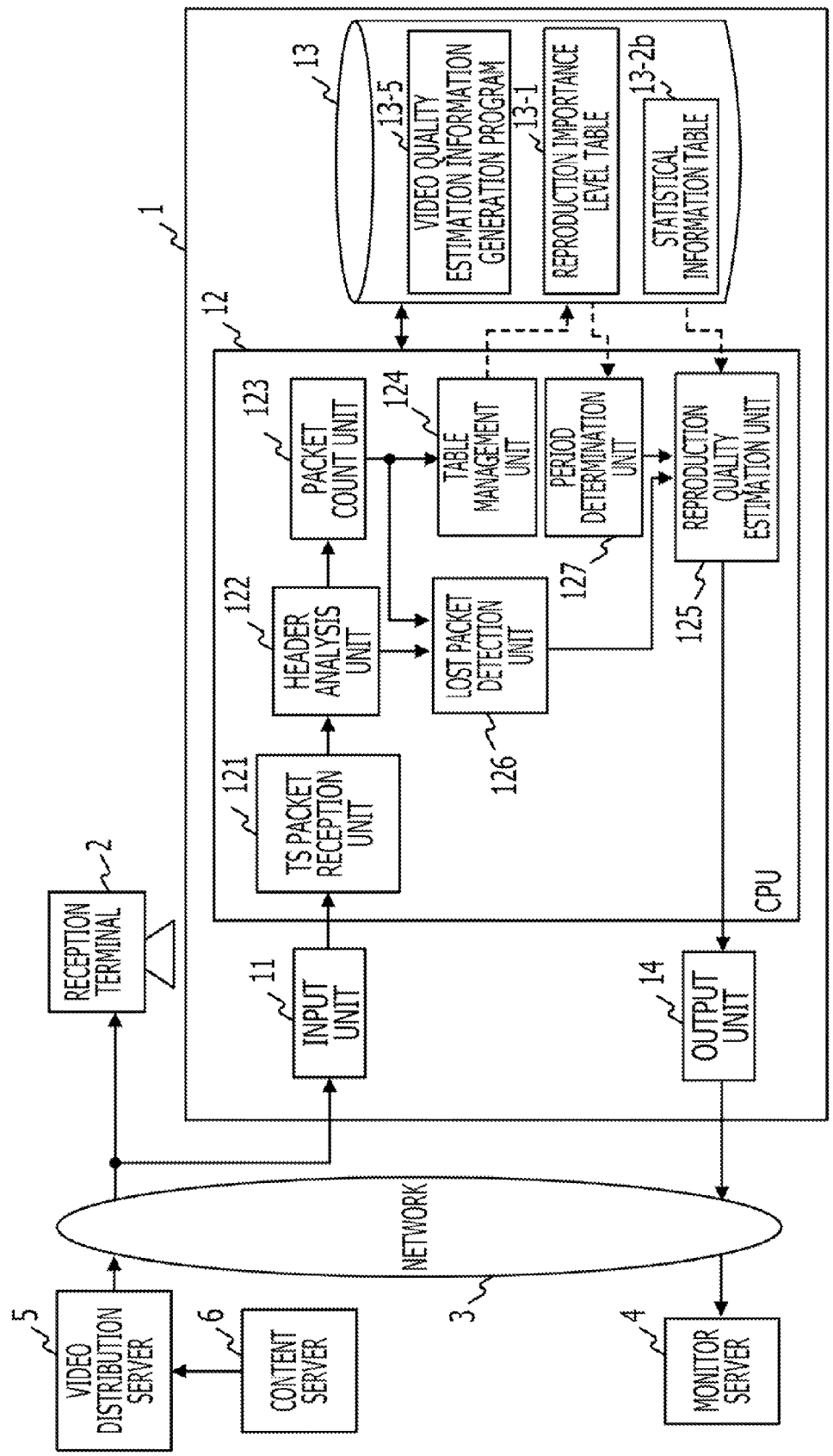
FIG. 10 illustrates a configuration example of the information processing apparatus.

FIG. 10 illustrates a configuration example of the information processing apparatus 1 according to the third embodiment. According to the third embodiment, substantially similar as in the first embodiment and the second embodiment, the information processing apparatus 1 is provided with the input unit 11, the processor 12, the storage unit 13, and the output unit 14. The storage unit 13 holds a video quality estimation information generation program 13-5.

By executing the video quality estimation information generation program 13-5 held in the storage unit 13, the processor 12 can realize a period determination unit 127 in addition to the TS packet reception unit 121, the header analysis unit 122, the packet count unit 123, the table management unit 124, the reproduction quality estimation unit 125, and the lost packet detection unit 126 described according to the first embodiment and the second embodiment.

The period determination unit 127 monitors the reproduction importance level table 13-1 and detects the loss of the initial packet on the basis of the periodicity of the number of packets in the received video frame.

Figure 11:
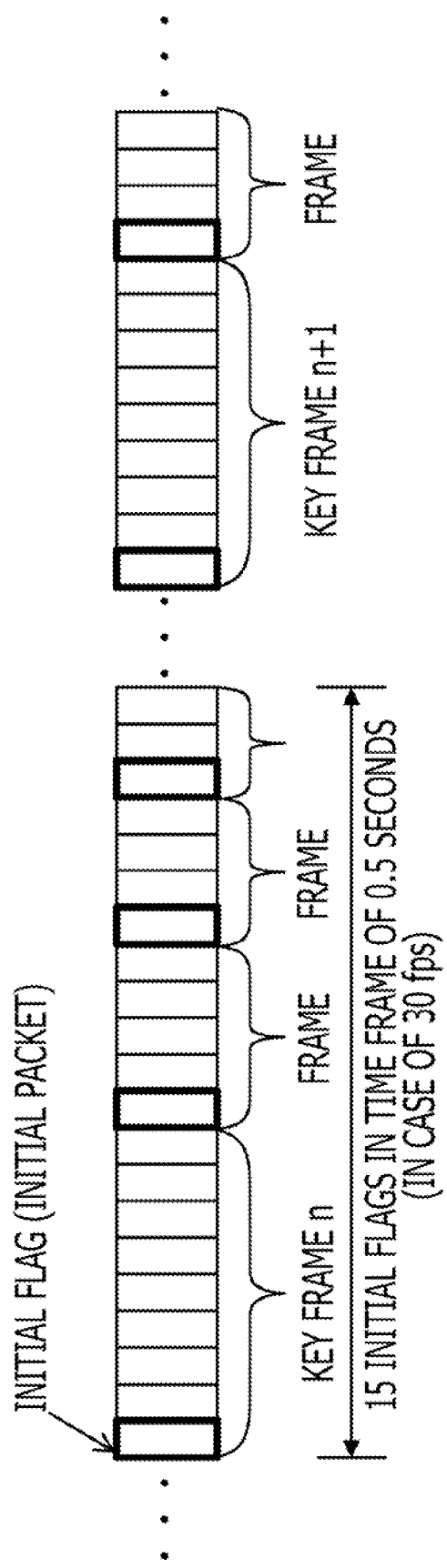
FIG. 11 is an explanatory diagram for describing a periodicity of the video frame.

FIG. 11 is an explanatory diagram for describing a periodicity of the video frame. In the example illustrated in FIG. 11, a video frame group whose frame rate is 30 fps (Frame Per Second) is illustrated. In the case of the video whose frame rate is 30 fps, 30 pieces of video frames are reproduced in one second. Also, for example, in a case where the MPEG-2 encoding is applied, in a period of the one frame every 15 frames, like I picture (Intra Picture) of MPEG-2, the video frame having the number of video packets greater than that of the other video frames appears. For example, in a case where the reproduction importance level table illustrated in FIG. 5 is set, the video frame larger than the above-mentioned other video frames is a video frame classified into a group where the number of packets is the greatest (the number of packets is greater than or equal to P2+1). The video frame described above that has the number of packets greater than that of the other video frames is referred to as key frame. That is, in the MPEG-2 encoded video whose frame rate is 30 fps, 15 pieces of video frames are reproduced in 0.5 seconds, and one of the video frames is the key frame.

The period determination unit 127 monitors the reproduction importance level table 13-1, and when the key frame appears, the video packets included in the video frame group that should be reproduced in 0.5 seconds while the key frame is set as the beginning are investigated.

The header of the TS packet has a field where information indicating a reference value of a system clock is stored. For example, in the case of MPEG-2 TS, a time stamp based on a clock synchronized on the video distribution side and the video reception side is stored in PCR (Program Clock Reference) in an adaptation field in the header of the TS packet. By referring to the PCR of the header of the TS packet, for example, by inspecting a difference with the PCR of the initial packet in the key frame, the period determination unit 127 can detect the video packets included in the video frames that should be reproduced in 0.5 seconds while the key frame is set as the beginning. It should be noted that the video packets are accumulated in the buffer of the storage unit 13 by the TS packet reception unit 121, and the period determination unit 127 detects the video packet from the buffer of the storage unit 13.

FIG. 12 is a flow chart illustrating an example of an investigation processing on the periodicity by the period determination unit 127. The period determination unit 127 monitors the reproduction importance level table 13-1 and detects the key frame classified into the group where the number of packets is greater than or equal to P2 (OP31).

The period determination unit 127 detects the video packet group included in the time frame of 0.5 seconds at the time of the reproduction while the key frame is set as the beginning from the buffer in the storage unit 13 (OP32).

The period determination unit 127 determines whether or not 15 initial packets (packets whose initial flag is "1") are included in the video packet group in the time frame of 0.5 seconds at the time of the reproduction while the detected key frame is set as the beginning (OP33). That is, the period determination unit 127 determines whether or not 15 video frames exist in the time frame of 0.5 seconds at the time of the reproduction while the key frame is set as the beginning.

In a case where the 15 initial packets are included in the time frame of 0.5 seconds at the time of the reproduction while the key frame is set as the beginning (OP33: Yes), as it is indicated that the 15 video frames exist in the time frame of 0.5 seconds, the period determination unit 127 determines that the lost video frame does not exist (OP34).

In a case where the number of the initial packets included in the time frame of 0.5 seconds at the time of the reproduction while the key frame is set as the beginning is less than 15 (OP33: No), the lost initial packet exists (OP35). The period determination unit 127 analyzes the continuity counter of the headers of the respective video packets included in the time frame of 0.5 seconds at the time of the reproduction while the key frame is set as the beginning, the initial flag, and the like to detect the lost initial packet and the lost video frame.

FIG. 13 is a flow chart illustrating an example of a detection processing for a lost initial packet by the period determination unit 127. In FIG. 13, a part of the video packet group included in the video frames that should be reproduced in 0.5 seconds while the key frame is set as the beginning is illustrated. In the video packet group illustrated in FIG. 13, only 14 initial packets are included, and the TS packet L1 that is the initial packet of the video frame n+1 and a plurality of subsequent TS packets are lost. A lower part of FIG. 13 illustrates a plurality of lost packets including the lost TS packet L1 and the adjacent TS packet 1 and TS packet 2. The TS packet 1 is a packet included in the video frame n.

In the example illustrated in FIG. 13, the period determination unit 127 detects that 15 initial packets do not exist in the video packet group included in the time frame of 0.5 seconds at the time of the reproduction while the key frame is set as the beginning which is read out from the buffer of the storage unit 13.

Next, the period determination unit 127 inspects the continuity counter of the detected video packet groups and extracts the video packet whose value of the continuity counter is not continuous. In the example illustrated in FIG. 13, the value of the continuity counter of the TS packet 1 is 10, and the value of the continuity counter of the TS packet 2 received immediately after the TS packet 1 is 4. Therefore, in the example illustrated in FIG. 13, the period determination unit 127 extracts the TS packet 1 and the TS packet 2.

The period determination unit 127 calculates the number of lost packets on the basis of the value of the continuity counter of the extracted video packet. The calculation method is substantially similar to the lost packet detection unit 126. That is, in the example illustrated in FIG. 13, the period determination unit 127 detects 9 (15−M+N=15−10+4) as the number of lost packets.

The period determination unit 127 regards the lost packets as the TS packets included in the video frame n+1 to obtain the video frame n and the number of packets in the video frame n+1. For example, in the example illustrated in FIG. 13, the period determination unit 127 detects the number of the TS packets from the initial packet before the extracted TS packet 1 until the TS packet 1 as the number of packets in the video frame n. For example, in the example illustrated in FIG. 13, the period determination unit 127 adds 9 which is the detected number of lost packets to the number of the TS packets from the extracted TS packet 2 until the next initial packet to obtain the number of packets in the video frame n+1.

The period determination unit 127 outputs the number of packets in the video frame n and the number of packets in the video frame n+1 to the reproduction quality estimation unit 125. The period determination unit 127 is equivalent to a detection unit.

The reproduction quality estimation unit 125 reads out the degradation quality value in accordance with the number of packets in the video frame n+1 from the reproduction importance level table 13-1 to be transmitted to the monitor server 4. It should be noted that in the example illustrated in FIG. 13, the lost packet is not included in the video frame n, but the video packet at the end of the video frame n may be lost. Thus, the degradation quality value of the video frame n is desirably transmitted to the monitor server 4.

According to the second embodiment, in a case where the packet loss is generated substantially similar as in the example illustrated in FIG. 13, the video frame n and the video frame n+1 are detected as one video frame including the lost packet. According to the information processing apparatus of the third embodiment, even in a case where the packet loss s generated similarly as in the example illustrated in FIG. 13, it is possible to appropriately detect the video frame n and the video frame n+1.

According to the information processing apparatus of the third embodiment, even in a case where the loss of the initial packet occurs, the video frame including the lost packet is appropriately detected, and the degradation quality value can be assigned to the video frame including the lost packet.

Also, substantially similar as in the first embodiment and the second embodiment, by analyzing the header of the video packet, the information processing apparatus detects the video frame including the lost packet and can assign the evaluation value, which is efficient.

Also, according to the first to third embodiments, the case has been described in which the video is transmitted through MPEG-2 TS, but the specification is not limited to MPEG-2 TS. For example, the present invention can also be applied in a case where the video is transmitted through MPEG-2 TTS (Transmitted TS). MPG-2 TTS is obtained by adding a four-byte time stamp to the beginning of the header of the TS packet of MPEG-2.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. An information processing apparatus comprising:
a storage including executable instructions; and
a processor which executes the instructions and is configured to:
receive a packet string in which packet groups including data on a plurality of video frames and having an identifier indicating a beginning of the video frame assigned to respective packets including each initial part of the plurality of video frames are arranged in a video reproduction order;
count a number of received packets corresponding to each of the plurality of video frames based on respective initial packets in the packet string; and
generate video quality estimation information for each of the plurality of video frames to estimate a quality of the video in which the plurality of video frames are decoded on a reception terminal based on the number of received packets corresponding to each of the plurality of video frames.

2. The information processing apparatus according to claim 1, wherein the processor obtains a number obtained by adding 1 to the number of received packets during a period from a time when the initial packet is received until a next initial packet is received as the number of received packets corresponding to one of the plurality of video frames.

3. The information processing apparatus according to claim 1, wherein the processor is further configured to calculate a number of packets lost on a network based on continuous numbers assigned to the respective packets in the packet string received.

4. The information processing apparatus according to claim 1, wherein the processor is further configured to detect, while the initial packet in the packet string received is set as the beginning of the video frame, when the number of initial packets included in the plurality of packets that should be reproduced in a predetermined time is less than a predetermined value, a loss of at least one initial packet in the plurality of video packets that should be reproduced in the predetermined time.

5. An information generation method for causing a computer to execute:
receiving a packet string in which packet groups including data on a plurality of video frames and having an identifier indicating a beginning of the video frame assigned to respective packets including each initial part of the plurality of video frames are arranged in a video reproduction order;

counting a number of received packets corresponding to each of the plurality of video frames based on respective initial packets in the packet string; and generating video quality estimation information for each of the plurality of video frames to estimate a quality of the video in which the plurality of video frames are decoded on a reception terminal based on the number of received packets corresponding to each of the plurality of video frames.

6. A non-transitory computer-readable storage medium including a program to cause an information generation method to execute operations on a computer, the program comprising:

receiving a packet string in which packet groups including data on a plurality of video frames and having an identifier indicating a beginning of the video frame assigned to respective packets including each initial part of the plurality of video frames are arranged in a video reproduction order;

counting a number of received packets corresponding to each of the plurality of video frames based on respective initial packets in the packet string; and generating video quality estimation information for each of the plurality of video frames to estimate a quality of the video in which the plurality of video frames are decoded on a reception terminal based on the number of received packets corresponding to each of the plurality of video frames.

* * * * *